United States Patent [19]

Kamada et al.

[11] Patent Number: 4,886,704
[45] Date of Patent: Dec. 12, 1989

[54] STRIPPABLE COATING FILM AND COATING METHOD USING SAME

[75] Inventors: Keiichi Kamada; Motoyuki Torikai, both of Yokohama; Yasuo Ohkita, Naka, all of Japan

[73] Assignee: Mitsui Toatsu Chemicals, Incorporated, Tokyo, Japan

[21] Appl. No.: 69,554

[22] PCT Filed: Oct. 26, 1985

[86] PCT No.: PCT/JP85/00594
§ 371 Date: Jun. 26, 1987
§ 102(e) Date: Jun. 26, 1987

[87] PCT Pub. No.: WO87/02689
PCT Pub. Date: May 7, 1987

[51] Int. Cl.$^4$ .............................. B05D 3/06; B32B 5/16
[52] U.S. Cl. .............................. 428/323; 427/531; 427/259; 427/282; 428/343; 428/494; 428/515; 428/520; 428/522; 524/560; 524/566
[58] Field of Search .............. 427/53.1, 259, 282; 428/494, 343, 515, 323, 518, 520, 522; 132/88.5; 33/563; 524/560, 566

[56] References Cited

U.S. PATENT DOCUMENTS

| | | | |
|---|---|---|---|
| 4,201,799 | 5/1980 | Stephens | 427/142 |
| 4,217,379 | 8/1980 | Salvador | 428/15 |
| 4,245,003 | 1/1981 | Oransky et al. | 427/53.1 |
| 4,358,482 | 11/1982 | Jubelt | 427/259 |
| 4,578,281 | 3/1986 | Ebisawa et al. | 427/53.1 |
| 4,598,127 | 7/1986 | Kotani et al. | 428/352 |

FOREIGN PATENT DOCUMENTS 688494 10/1966 Belgium .

OTHER PUBLICATIONS

Database WPIL, No. 85-021113, Derwent Publications, Ltd., London, GB; JP-A-59 215 365 (5-12-84) (Abstract).

Primary Examiner—George F. Lesmes
Assistant Examiner—James B. Monroe, II
Attorney, Agent, or Firm—Millen, White & Zelano

[57] ABSTRACT

This invention relates to a strippable coating film for use as a masking material serving to create attractively finished boundaries, for example, in multi-color painting of automobiles and the like, as well as a coating method using such a coating film.

A coating film containing 1 to 20 parts by weight of carbon black per 100 parts by weight of the resin component present therein is suitable. Especially preferred is a coating film formed of an acrylic emulsion paint and having an adhesion to the substrate of 20 to 1000 g/inch as expressed in terms of 180° peeling strength. It is disclosed that, by equipping a YAG laser with a Q-switching oscillator unit and operating the Q-switch at a pulse repetition frequency of 0.5 to 30 kHz, the coating film can be cleanly cut to achieve an attractive finish in multi-color painting. Alternatively, a two-layer coating film containing the above-defined amount of carbon black may be formed by applying a coating material having adhesive power to a substrate to form an undercoating layer in contact with the substrate and then applying a coating material having flexibility and exhibiting film-forming properties to the undercoating layer to form an overcoating surface layer. This two-layer coating film is more effective than the single-layer coating film in preventing the substrate from being damaged.

7 Claims, 9 Drawing Sheets

STRIPPABLE COATING FILM AND COATING METHOD USING SAME

TECHNICAL FIELD

This invention relates to a novel strippable coating film and a method of using the same. More particularly, it relates to a strippable coating (or masking) film for creating attractively finished boundaries in multi-color painting of automobiles and the like, as well as a coating method using the same.

BACKGROUND ART

Recently, in the field of automobiles, motorcycles and the like, so-called multi-color painting (i.e., painting in two or more colors) of various parts (e.g., bumpers, decorative body lines and stripes, motorcycle gasoline tanks, motorcycle windshields, and the like) prevails in the manufacture of new products or the repair of such vehicles.

In multi-color painting, it is regarded as important from the viewpoint of commercial value to prevent the intermingling of colors in boundaries (i.e., the regions bounding different colors) and thereby create sharp boundary lines.

Thus, it has been a conventional practice in multi-color painting to cover the parts not intended to be coated with masking tape, used newspaper, film or the like, protect the boundaries with masking tape, apply a coat of paint, and then remove the masking tape and the like.

However, the use of masking tape has the disadvantage that the boundaries cannot be finished as attractively as might have been expected, because (1) it is difficult to apply masking tape in a straight line and (2) portions of the applied masking tape may separate from the substrate and allow the paint to penetrate into the gaps therebetween.

DISCLOSURE OF THE INVENTION

Accordingly, the present inventors studied, from various angles of vision, the coating method comprising the step of applying a strippable paint to an object to be coated, drying the applied strippable paint, cutting the film so formed with a suitable cutting tool, stripping off the unnecessary portions of the film, and then applying a desired coat of paint to the exposed parts of the object to be coated.

As a result, the use of a knife as the cutting tool was found to be disadvantageous in that the precision of the finish may vary according to the skill of the worker, it is difficult to cut the film alone without causing damage to the base material or substrate comprising the object to be coated, and the knife edge will soon be worn away and become dull.

Thus, the present inventors made further studies with their attention focused on the cutting method using a laser beam.

A carbon dioxide gas laser, which is recently used in the cutting of materials, makes it possible to cut metallic and non-metallic materials, glass and the like easily and to cut wood and the like without producing noises or swarf. Moreover, paper, cloth, leather and the like can also be cut cleanly and rapidly. However, in the cutting of thin plastic films such as a thin film (e.g., a strippable coating film) used for protecting a surface of an article temporarily, or a thin layer forming a part of an article, it has been found difficult to cut only the thin film or thin layer (hereinafter referred to simply as thin film) by means of a $CO_2$ gas laser without causing damage to the main body of the article.

On the other hand, a YAG laser beam which is one type of laser beam may be passed through optical fibers, so that it is not only useful for purposes of optical communication, but also now in use for microscopic drilling or other processing of semiconductors and printed circuit materials. However, few publications can be found that report its use for the processing of a surface layer alone. Experiments using a YAG laser have revealed the intended purpose of cutting a film cannot be accomplished satisfactorily. Accordingly, the present inventors have made an investigation on the type of film used and has found that, if a strippable paint containing 1 to 20% by weight of carbon black (based on the resin component) in the dry film is applied, only the overlying film can be cut with the aforesaid laser and, therefore, a method for creating attractive boundaries can be realized.

Specifically, the present invention provides:

(1) a strippable coating film containing 1 to 20 parts by weight of carbon black per 100 parts by weight of the resin component present therein;

(2) a strippable coating film consisting of two layers of resin coating materials, characterized in that the undercoating layer in contact with the object to be coated contains therein 1 to 20 parts by weight (based on the resin component) of carbon black and has adhesive power, and the overcoating layer located on the surface side contains therein 1 to 20 parts by weight (based on the resin component) of carbon black, have flexibility and do not exhibit surface tack; and (3) a coating method for creating attractively finished boundaries which comprises the steps of forming a coating film as described above on an object to be coated, cutting the film with a laser beam from a YAG laser, stripping off the unnecessary portions of the laser-cut film, applying a final coat of paint to the parts from which the film has been removed, and then stripping off the remaining portions of the masking film.

BEST MODE FOR CARRYING OUT THE INVENTION

Figure 1:
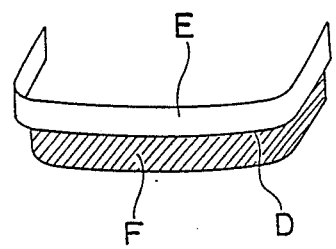
FIG. 1 is a perspective view for illustrating an example of practice of the coating method of the present invention.

The strippable coating film of the present invention is formed by applying a so-called strippable paint to an object to be coated and then drying it. Since this film is used for the purpose of covering and protecting a surface of the article (or the object to be coated) temporarily, it must have a certain level of adhesive power and a sufficient level of strength to permit it to be stripped off without getting torn.

Typical strippable paints meeting these requirements include water-based paints comprising acrylic emulsions, vinyl acetate emulsions, ethylenevinyl acetate, polyurethane and the like, as well as solvent-based paints comprising vinyl chloride sol, polyvinyl butyral, vinyl acetate, polyurethane and the like.

The adhesion of the film to the substrate (or the object to be coated) should preferably be in the range of 20 to 1000 g/inch as expressed in terms of 180° peeling strength. If the adhesion is less than 20 g/inch, the film will adhere insufficiently and will tend to peel off during operation. If the adhesion is greater than 1000 g/inch, the film will adhere so closely that an unduly great force will be required to strip off the film, possibly resulting in its tearing.

In addition, the film must contain therein 1 to 20 parts by weight, based on the resin component, of carbon black so that it may be easily cut with a low-power YAG laser as described above. If the amount of carbon black is less than 1 part by weight, the laser cutting cannot be achieved smoothly, while if it is greater than 20 parts by weight, the film will become hard and, moreover, will exhibit an undesirable tendency to release powdery carbon black.

No particular limitation is placed on the type of carbon black which is incorporated in the aforesaid strippable paint. That is, there may be used various commercially available types of carbon black including furnace black, lamp black, thermal black, acetylene black, German furnace black and the like. Where carbon black is to be incorporated in an emulsion paint, it is preferable to disperse the carbon black in water beforehand and use the resulting aqueous dispersion.

In order to obtain a paint which, though containing 1 to 20 parts by weight of carbon black, gives a coating film having flexibility and not exhibiting surface tack, it is especially preferable to use, among the aforesaid water-based paints, a coating composition comprising the following ingredients:

| | |
|---|---|
| Acrylonitrile | 25 to 40 parts by weight |
| Butyl acrylate | 65 to 40 parts by weight |
| (Meth)acrylic acid | 0.5 to 10 parts by weight |

In this composition, if the amount of acrylonitrile is less than 25 parts by weight, the formed film will have insufficient strength, while it is greater than 40 parts by weight, the film will be so hard and so apt to crack that its stripping operation may be difficult.

Butyl acrylate in an amount of 65 to 40 parts by weight is required to adjust the flexibility of the film properly.

(Meth)acrylic acid contributes to the stability of particles in the emulsion. If the amount of (meth)acrylic acid is less than 0.5 parts by weight, the particles will tend to agglomerate and the emulsion may be hard to handle, while if it is greater than 20 parts by weight, the emulsion will show an increase in viscosity and may be hard to handle again.

Among the solvent-based paints, a vinyl chloride resin is preferred. The plasticizers which may suitably be used in the vinyl chloride resin include phthalic acid alkyl esters such as dioctyl phthalate, dibutyl phthalate, etc; straight-chain dibasic acid alkyl esters such as dioctyl adipate, etc.; and phosphoric acid esters such as tricresyl phosphate, etc. The plasticizer is used in an amount of 25 to 150 parts, preferably 30 to 100 parts, per 100 parts of the vinyl chloride resin.

The strippable paint may be applied according to any of various conventional techniques including spray coating, curtain flow coating, roll coating, brushing and dipping. It is desirable to apply the paint as evenly as possible.

The thickness of the applied paint should be such that the resulting dry film has sufficient strength to be strippable and does not have discontinuities or pinholes causing the substrate to be exposed. Generally, the dry film thickness may suitably be of the order of 10 to 100 $\mu$. If the thickness is less than 10 $\mu$, the film will generally be weak, will be liable to get torn and hence hard to strip, and will tend to produce pinholes and discontinuities. If the thickness is greater than 100 $\mu$, it will be difficult to form a film having smooth surfaces because cracking or shrinkage may occur on drying. Moreover, a thickness of 100 $\mu$ would be amply sufficient for making purposes and greater thicknesses are wasteful because such a film requires an unduly large amount of paint and much time to dry it.

The applied strippable paint may be dried to such a degree as to form a film. The drying conditions may be determined according to the type of strippable paint used. Generally, the drying is carried out at a temperature ranging from room temperature to about 200° C. for a period of time ranging from 0.5 minute to 12 hours.

Now, the present coating method for creating attractively finished boundaries will be described hereinbelow.

The present invention is concerned with a coating method using a strippable paint for masking purposes and the strippable paint is used to form a protective coat on a substrate comprising an object to be coated. Typical examples of the substrate include, but are not limited to, molded articles made of plastic materials such as polypropylene, polyethylene, vinyl chloride resins, polystyrene, ABS, polycarbonates, etc.; metal plates such as stainless steel plates, aluminum plates, steel plates, etc.; coated plates such as coated steel plates, etc.; decorative plywood panels; and the like.

A carbon black-containing strippable coating film as described above is formed on such an object to be coated and the resulting film is then cut. In accordance with the present invention, a laser is used as the cutting means. Useful lasers are laser oscillators emitting light of wavelengths ranging from the visible to the near infrared region. A $CO_2$ gas laser emitting light of wavelengths in the infrared region is not desirable because the laser light has a strong tendency to cut not only the superficial strippable film but also almost all types of plastic materials and coatings which may be used in the substrate.

It is preferable to use a YAG laser (emitting light of wavelengths in the near infrared region) or a dye laser (emitting light of wavelengths in the visible region). Especially preferred is a YAG laser. The YAG laser only needs to have an output power of 1 to 20 W in the single mode.

A dye laser permits its output energy to be efficiently absorbed in the strippable film, because it emits light of wavelengths in the visible region. The dye laser only needs to have an output power sufficient to cut the strippable film by melting.

More preferably, a YAG laser equipped with a Q-switch is used. In this case, the strippable film can be most cleanly cut in a pulse repetition frequency range of 500 Hz to 5 kHz. Although the strippable film can also be cut cleanly enough in a pulse repetition frequency range of 5 kHz to 50 kHz, not only the strippable film is cut but also the plastic substrate may often be damaged unless the focus of the laser beam is moved quickly. This is because, in most cases, the plastic molded article constituting the substrate contains carbon black in order to improve its performance. However, this is not true of plastic molded articles containing no carbon black, and attractive boundaries can be created even in the pulse repetition frequency range of 5 kHz to 50 kHz. At pulse repetiton frequencies lower than 500 Hz, the strippable film may not be cut if the focus of the laser beam is moved quickly. Although good results can be obtained by moving the laser beam slowly, this would not be suitable for the operation whose purpose is to create boundaries in a masking film.

In this manner, the strippable film is cut with a laser beam and the unnecessary portions of the film are stripped off. Thereafter, a final coat of paint is applied to the parts from which the film has been removed.

The paint used in final coating may be selected according to the intended purpose. Where a solvent-based paint is to be applied, the strippable paint used for masking purposes should desirably be a water-based one (in particular, one prepared by emulsion polymerization). On the other hand, where a water-based paint is to be applied, the strippable paint used for masking purposes may be a water-based or a solvent-based one. In either case, the strippable paint used for masking purposes should preferably be resistant to the paint used in final coating. However, these requirements are not essential provided that the intended masking function is fulfilled properly.

After a final coat of paint has been applied, the strippable film used for masking purposes may be stripped off before the final coat of paint hardens, because this creates more attractive boundaries. If the strippable film is stripped off after the final coat of paint has been dried, the boundaries may become jagged. This is especially true in cases where the resulting film is hard (to such an extent that it tends to crack at room temperature).

Now, in accordance with another feature of the present invention, a strippable coating film consisting of two layers of resin coating materials and a novel coating method for creating attractively finished boundaries by using such a film will be described hereinbelow.

The unique resin coating film of two-layer construction in accordance with the present invention consists o a surface coat constituting its overcoating layer and an adhesive resin layer constituting its undercoating layer, and the substrate or object to be coated is protected by the surface coat via the adhesive resin layer.

Accordingly, the coating material used for forming the surface coat may be any conventional coating material that has been used for the formation of a strippable film. Typical examples of such coating materials include water-based paints comprising acrylic emulsions, vinyl acetate emulsions, ethylene-vinyl acetate and the like, as well as solvent-based paints comprising vinyl chloride sol, polyvinyl butyral, vinyl acetate and the like.

This surface coat must contain therein 1 to 20 parts by weight, based on the resin component, of carbon black so that it may be easily cut with a lowpower YAG laser as described above. If the amount of carbon black is less than 1 part by weight, the laser cutting cannot be achieved smoothly, while if it is greater than 20 parts by weight, the film will become hard and, moreover, will exhibit an undesirable tendency to release powdery carbon black. The type and particle size of carbon black may be the same as previously described.

In order to obtain a coating material which, though containing 1 to 20 parts by weight of carbon black, gives a surface coat having flexibility and not exhibiting surface tack, it is especially preferable to use, among the aforesaid coating materials, a coating composition comprising the following ingredients:

| Acrylonitrile | 25 to 40 parts by weight |
| Butyl acrylate | 65 to 40 parts by weight |
| (Meth)acrylic acid | 0.5 to 10 parts by weight |

In this composition, if the amount of acrylonitrile is less than 25 parts by weight, the formed film will have insufficient strength, while it is greater than 40 parts by weight, the film will be so hard and so apt to crack that its stripping operation may be difficult.

Butyl acrylate in an amount of 65 to 40 parts by weight is required to adjust the flexibility of the film properly.

(Meth)acrylic acid contributes to the stability of particles in the emulsion. If the amount of (meth)acrylic acid is less than 0.5 parts by weight, the particles will tend to agglomerate and the emulsion may be hard to handle, while if it is greater than 10 parts by weight, the emulsion will show an increase in viscosity and may be hard to handle again.

The overcoating layer should preferably have a dry film thickness of 10 to 100 $\mu$ from the viewpoint of substrate protection and peeling strength.

The undercoating layer in contact with the substrate comprising the object to be coated should have proper levels of adhesive power and strippability relative to the substrate, act as a buffer zone for preventing the laser beam from reaching the substrate during the cutting operation, and adhere closely to the aforesaid surface coat so as to form an integral film which can be stripped off after the surface coat has been cut.

Accordingly, the coating material used for forming the undercoating layer should desirably have adhesive properties. For example, aqueous emulsions such as acrylic emulsions, vinyl acetate emulsions and ethylene-vinyl acetate emulsions may be used. Especially preferred are aqueous acrylic, vinyl acetate or ethylenevinyl acetate emulsions forming a film whose adhesion to the substrate is 20 to 1000 g/inch, more preferably 30 to 600 g/inch, as expressed in terms of 180° peeling strength. Useful acrylic resins include homopolymers and copolymers of butyl acrylate or 2-ethylhexyl (meth)acrylate; copolymers of these monomers; copolymers of butyl acrylate or 2-ethylhexyl (meth)acrylate and copolymerizable monomers such as acrylates (acrylic esters), methacrylates, styrene, α-methylstyrene, acrylonitrile, divinylbenzene, ethylene glycol di(meth)acrylate, etc.; and the like.

The undercoating layer must also contain the same type of carbon black as used in the overcoating layer, in an amount of 1 to 20 parts by weight based on the resin component. Provided that the carbon black content is in this range, the laser beam which may reach the undercoating layer during the cutting of the overcoating layer will be absorbed and cause no damage to the substrate. If the carbon black content is greater than 20 parts by weight, the film will become hard and lose its adhesive power and strippability.

The undercoating layer performing the aforesaid functions only needs to have a dry film thickness of 10 to 100 $\mu$. Thus, imperfect cutting of the film and damage to the substrate can be prevented in spite of variation in the thickness of the overcoating layer and variation in the output or operating conditions of the laser. Consequently, cutting and stripping of the coating film can be consistently and cleanly achieved to create attractively finished boundaries.

Furthermore, by incorporating an inorganic filler into the overcoating or the undercoating layer, a coating film having better cuttability with a laser can be obtained and the allowable range of laser output can be widened. Useful inorganic fillers include heavy calcium carbonate, light calcium carbonate, talc, clay, silica and the like. Among others, heavy calcium carbonate is preferred. The inorganic filler should preferably have an average particle diameter of the order of 0.1 to 10 $\mu$ so that it may be evenly dispersed in the coating layer. The inorganic filler may be used in an amount of 5 to 50 parts by weight, preferably 20 to 40 parts by weight, based on the resin component. If the amount of inorganic filler used is less than 5 parts by weight, the desired effect will not be produced, while if it is greater than 50 parts by weight, the coating paint will have an extremely high viscosity, exhibit poor application properties, and give a brittle film.

The laser cuttability of the coating film can be enhanced by incorporating the inorganic filler into the overcoating layer, but a similar effect will also be produced by incorporating it into the undercoating layer. That is, where the inorganic filler is incorporated into the undercoating layer, it acts effectively as a buffer for the laser beam attenuated by the overcoating layer.

This buffering effect can further be enhanced by adding aluminum powder to the undercoating layer. Thus, the laser beam shows a decreased penetrating power to the substrate and causes little damage to the substrate. The reason for this seems to be that the laser beam is irregularly reflected by the aluminum powder and diffused or absorbed in the undercoating layer.

The type of aluminum powder used may be of paint grade. The aluminum powder is used in an amount of 1 to 40 parts by weight, preferably 5 to 30 parts by weight, based on the resin component. If the amount of aluminum powder used is less than 1 part by weight, the desired effect will not be produced, while if it is greater than 40 parts by weight, the effect will reach a maximum level.

Now, the novel coating method for creating attractively finished boundaries by using the aforesaid resin coating film of two-layer construction will be described hereinbelow.

As to the object to be coated with the strippable coating film of the present invention, typical examples thereof include, but are not limited to, molded articles made of plastic materials such as polypropylene, polyethylene, vinyl chloride resins, polystyrene, ABS, polycarbonates, etc.; metal plates such as stainless steel plates, aluminum plates, steel plates, etc.; coated plates such as coated steel plates, etc.; decorative plywood panels; and the like.

The coating materials used for forming the overcoating and undercoating layers may be applied according to any of various conventional techniques including spray coating, curtain flow coating, roll coating, brushing and dipping. It is desirable to apply the coating materials as evenly as possible.

The thickness of the applied coating materials should be such that the resulting dry film has sufficient strength to be strippable and does not have discontinuities or pinholes causing the substrate to be exposed. Generally, the combined dry film thickness of the overcoating and undercoating layers may suitably be in the range of 20 to 300 $\mu$. If the thickness is less than 20 $\mu$, the film will generally be weak, will be liable to get torn and may be hard to peel off, and will tend to produce pinholes and discontinuities. If the thickness is greater than 100 $\mu$ with a single coating operation, it will be difficult to form a film having smooth surfaces because cracking or shrinkage may occur on drying. Moreover, a thickness of 300 $\mu$ would be amply sufficient for making purposes and greater thicknesses are wasteful because such a film requires an unduly large amount of coating materials and much time to dry them.

The applied coating materials may be dried in such a way that the undercoating material is first applied and dried, and the overcoating materials is then applied and dried. Alternatively, this may be by applying the undercoating and overcoating materials successively and then drying them simultaneously. The drying conditions may be determined according to the type of coating materials used. Generally, the drying is carried out at a temperature ranging from room temperature to about 200° C. for a period of time ranging from 0.5 minute to 12 hours.

As the means for cutting the film so formed, a laser is used as described above. Useful lasers are laser oscillators emitting light of wavelengths ranging from the visible to the near infrared region. A $CO_2$ gas laser emitting light of wavelengths in the infrared region is not desirable because the laser light has a strong tendency to cut not only the superficial strippable film but also almost all types of plastic materials and coatings which may be used in the substrate.

It is preferable to use a YAG laser (emitting light of wavelengths in the near infrared region) or a dye laser (emitting light of wavelengths in the visible region). Especially preferred is a YAG laser. The YAG laser only needs to have an output power of 1 to 20 W in the single mode.

A dye laser permits its output energy to be efficiently absorbed in the coating film, because it emits light of wavelengths in the visible region. The dye laser only needs to have an output power sufficient to cut the overcoating layer by melting.

More preferably, a YAG laser equipped with a Q-switch is used. In this case, the coating film can be most cleanly cut in a pulse repetition frequency range of 500 Hz to 30 kHz and preferably 1 to 20 kHz. Although the coating film can also be cut cleanly enough at pulse repetition frequencies higher than 30 kHz and up to 50 kHz, not only the strippable film is cut but also the plastic substrate may often be damaged unless the focus of the laser beam is moved quickly. This is because, in most cases, the plastic molded article constituting the substrate contains carbon black in order to improve its performance. However, this is not true of plastic molded articles containing no carbon black, and attractive boundaries can be created even at pulse repetition frequencies higher than 30 kHz and up to 50 kHz. At pulse repetition frequencies lower than 500 Hz, the film may not be cut if the focus of the laser beam is moved quickly. Although good results can be obtained by moving the laser beam slowly, this would not be suitable for the operation whose purpose is to create boundaries in a masking film.

In this manner, the overcoating layer is cut with a laser beam and then stripped off, so that the overcoating and undercoating layers are cleanly removed as an integral film along the cutting line. After the unnecessary portions of the film are stripped off, a final coat of paint is applied to the parts from which the film has been removed.

The paint used in final coating may be selected according to the intended purpose. Where a solvent-based paint is to be applied, the overcoating material used for masking purposes should desirably be a water-based one (in particular, one prepared by emulsion polymerization). On the other hand, where a water-based paint is to be applied, the overcoating material used for masking purposes may be a water-based or a solvent-based one. In either case, the overcoating material used for masking purposes should preferably be resistant to the paint used in final coating. However, these requirements are not essential provided that the intended masking function is fulfilled properly.

After a final coat of paint has been applied, the film used for masking purposes may be stripped off before the final coat of paint hardens, because this creates more attractive boundaries. If the film is stripped off after the final coat of paint has been dried, the boundries may become jagged. This is especially true in cases where the resulting film is hard (to such an extent that it tends to crack at room temperature).

The present invention is further illustrated by the following examples.

The symbols used in the examples and comparative examples given below are as follows:

2EHA ... 2-ethylhexyl acrylate; BA ... butyl acrylate; AN ... acrylonitrile; AA ... acrylic acid; MMA ... methyl methacrylate; DVB ... divinylbenzene; MAc ... methacrylic acid; AM ... acrylamide; HEMA ... hydroxyethyl methacrylate; CB ... carbon black; BMA ... butyl methacrylate.

In these examples, parts are by weight.

EXAMPLE 1

This example illustrates the preparation of typical acrylic emulsion type strippable paints for use in the formation of coating films in accordance with the present invention (the overcoating layer in the case of coating films of two-layer construction), the workability and application thereof, the adhesion of coating films formed of acrylic strippable paints containing various resin components, the laser cuttability thereof, and the like.

1-A Preparation of an acrylic emulsion and a strippable paint

Into a 2-liter four-necked flask fitted with a reflux condenser, a thermometer and a stirrer were charged 1000 g of purified water and 2 g of sodium dodecylbenzenesulfonate (hereinafter abbreviated as DBS). While nitrogen gas was being passed through the flask, its contents were heated to 70° C. On the other hand, 350 g of AN, 580 g of BA, 20 g of MAc, 20 g of AM, and 30 g of HEMA were mixed and a 5/100 portion of the resulting mixture was reserved in another vessel. 3 g of DBS was added to and mixed with the remaining portion of the mixture. To the aforesaid 2-liter flask containing warm water were added 5 g of potassium persulfate and then the previously reserved 5/100 portion of the monomer mixture. After polymerization was carried out for an hour, the remaining 95/100 portion was added over a period of 5 hours and the reaction mixture was then polymerized for an additional 4 hours. The reaction mixture was cooled to 45° C. or below and neutralized with 14% aqueous ammonia to obtain an acrylic emulsion (having a resin content of 49.5%). To this emulsion ere added 20 g of dioctyl phthalate (hereinafter abbreviated as DOP), 40 g of a wetting agent (commercially available from Air Products Co., Ltd. under the trade name of Surfinol 104 E) and 100 g of an aqueous dispersion of carbon black (commercially available from Dainichi Seika Co., Ltd. under the trade name of EP-510BR and having a carbon black content of 37% by weight). Thus, there was obtained a strippable paint suitable for the formation of a coating film in accordance with the present invention.

1-B Formation of a coating film, its performance characteristics, and an instance of multi-color painting Using the strippable paint prepared as above, a bumper consisting essentially of polypropylene and illustrated in FIG. 1 was painted in such a way that the color (black) of the substrate was exposed in the part E and the same color (e.g., a metallic silver color) as that of the body was imparted to the part F.

Specifically, the strippable paint prepared as above was applied to a molded bumper by means of a spray gun and then dried in a large-sized dryer at 80° C. for 10 minutes to form a dry film. This film had an average thickness of 40 $\mu$.

Subsequently, an optical fiber scope was connected with a YAG laser (manufactured by NEC and having a multi-output power of 2 W), and the boundary line between the parts E and F of the bumper was cut with a laser beam. For this purpose, the laser was equipped with a Q-switch and operated at a pulse repetition frequency of 3 kHz. The cutting speed was 100 mm/min and the laser output was 3 W.

After the strippable film was stripped from the part F, the surface of the bumper was cleaned by exposing it to trichloroethane vapor for 30 seconds.

A solvent-based primer coat consisting essentially of chlorinated polypropylene was applied to the uncoated part F so as to give an average dry film thickness of 15 $\mu$ and then dried at 80° C. for 30 minutes. Thereafter, a solvent-based finishing coat of acrylic urethane type was applied thereto so as to give an average dry film thickness of 30 $\mu$ and then dried at 80° C. for 45 minutes.

When the strippable film was stripped from the part E, there was obtained a colored bumper having an attractive boundary between the parts E and F.

On the other hand, a 10 cm × 20 cm flat plate was cut out of the material used for the formation of the bumper, and the strippable paint was applied thereto under the same conditions as described above. Using a cutting knife, two parallel cuts with a distance of 1 inch were made in the film so that a strip of film might be peeled off. Then, its 180° peeling strength was measured with a tensile tester.

The average peeling strength of three measurements was 80 g/inch.

1-C Performance of paints and coating films having various resin compositions Strippable paints having the respective resin compositions shown in Tables 1-1 to 1-3 were prepared in the same manner as described in 1-A. Each of the strippable paints was applied with a spray gun to a polypropylene test panel (100 × 100 × 3 mm) as illustrated in FIG. 2, and then dried at 80° C. for 30 minutes to obtain a film having an average thickness of 80–120 $\mu$.

Figure 2:
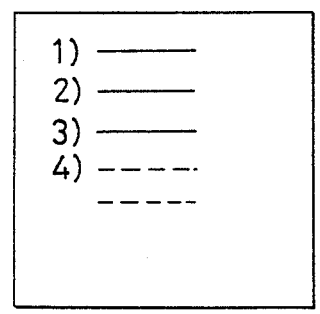
FIG. 2 is a plan view of a panel suitable for use in film cutting tests.
Figure 3:
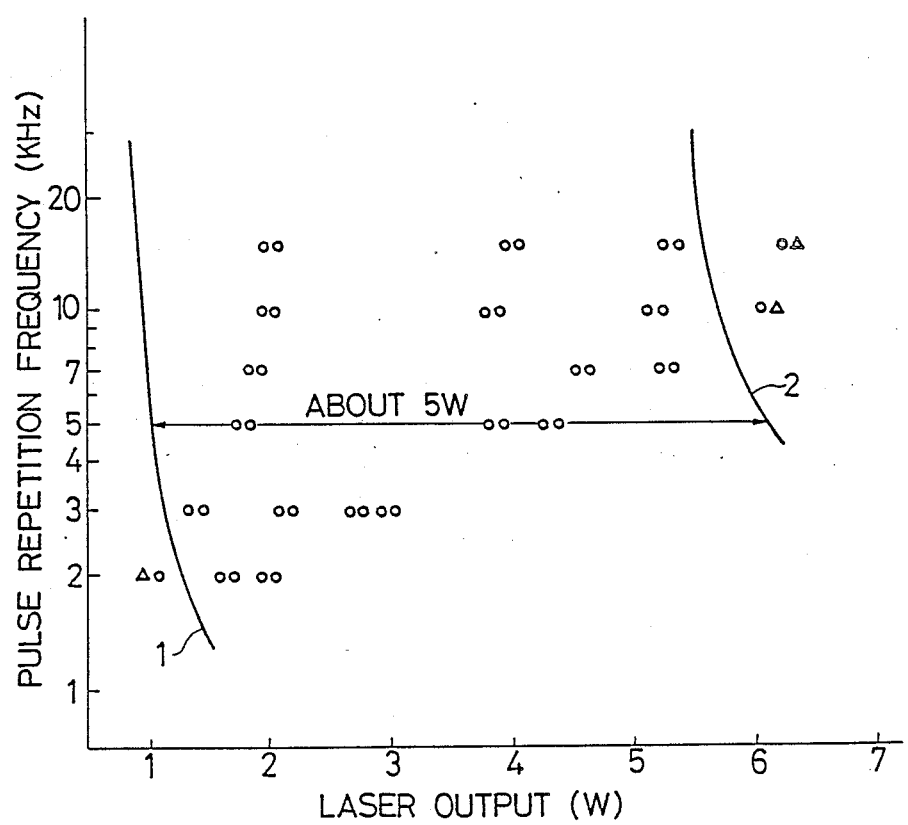
FIGS. 3 to 10 are graphs illustrating the optimum output range for film cutting purposes.
Figure 4:
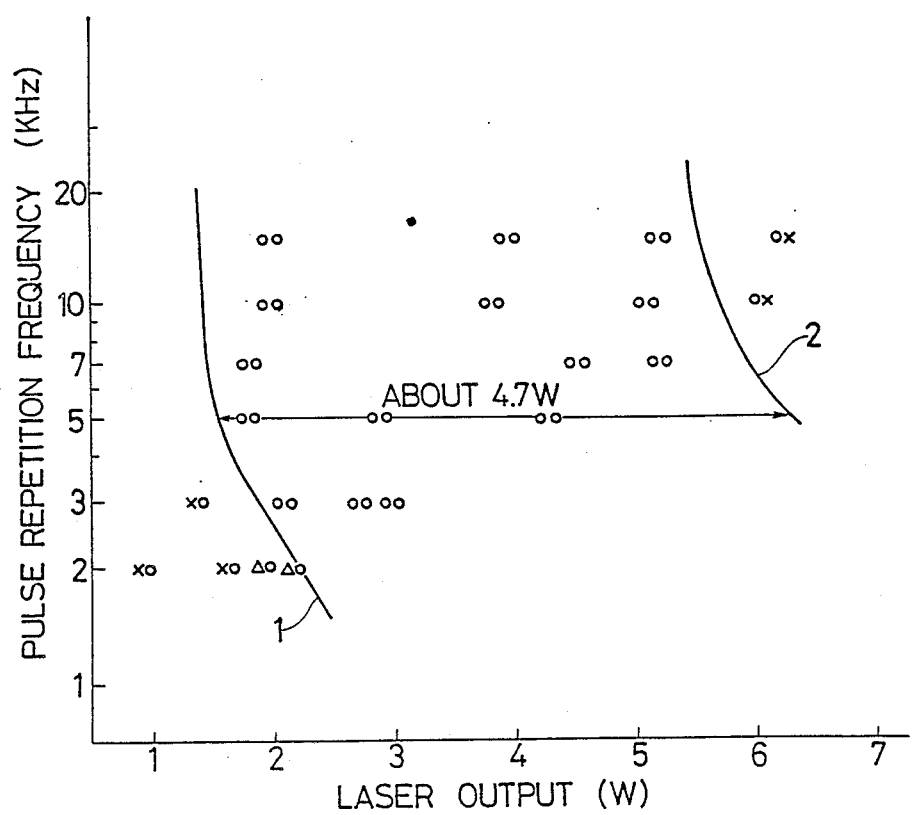
Figure 5:
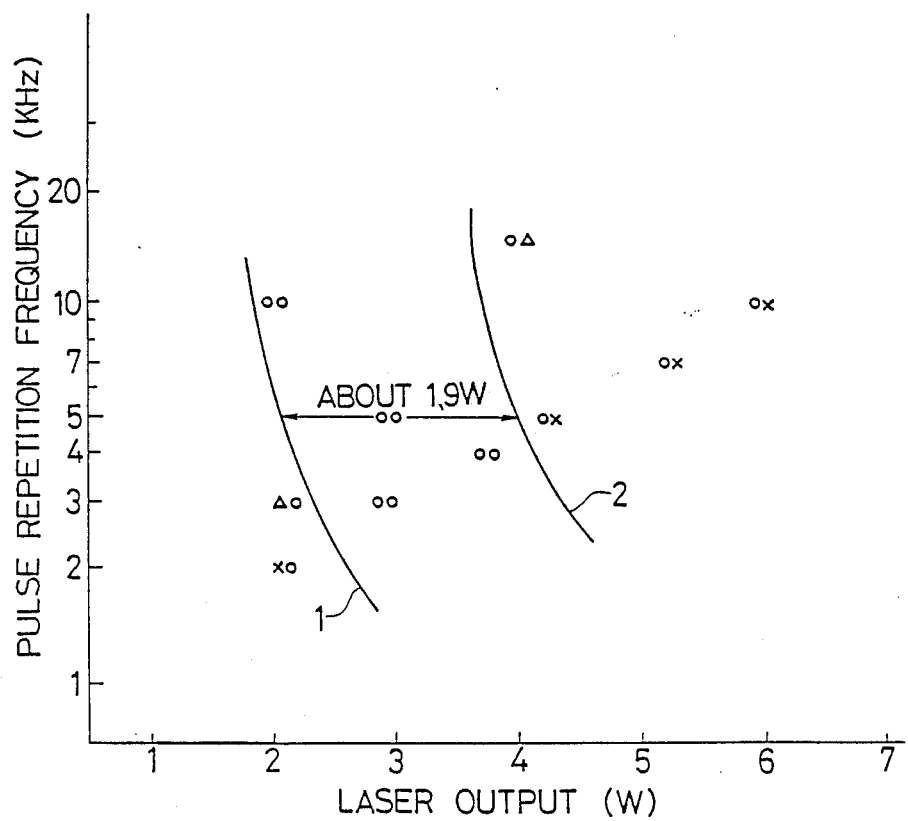

By using a YAG laser (SL-114F; manufactured by NEC) combined with a Q-switch, the film was cut under varying oscillation conditions (as shown at 1), 2), 3), ... in FIG. 2). After the cutting operation, the degree of cutting of the strippable film and the degree of damage to the PP panel substrate were examined. Then, the cuttability of the film was synthetically judged on the basis of the results thus obtained. Laser cutting conditions:
Laser : SL-114 (manufactured by NEC and having an output power of 20 W)
Q-switch: SL-231B
Mode : Single mode The adhesion of the films was evaluated by measuring their 180° peeling strength in the same manner as described in 1-B.

The workability of the strippable paints was judged on the basis of the occurrence of agglomeration or viscosity increase during its preparation.

ter referred to as C-3, C-5, C-10, C-20 and C-25 according to their respective carbon black contents.

By using a YAG laser (SL-114F; manufactured by NEC) combined with a Q-switch (SL-231B), each of these strippable films was cut under varying oscillation conditions.

After the cutting operation, the degree of cutting of the strippable film and the degree of damage to the PP panel substrate were examined.

Moreover, their 180° peeling strength was measured in the same manner as described in Example 1.

For purposes of comparison, the same procedure was repeated with a film containing no carbon black (hereinafter referred to as C-0).

The results of the cutting tests were as follows:

TABLE 1-1

|  |  | AN-1 | AN-2 | AN-3 | AN-4* | AN-5 | AN-6 |
|---|---|---|---|---|---|---|---|
| Proportions | AN | 20 | 25 | 30 | 35 | 40 | 45 |
| of | BA | 73 | 68 | 63 | 58 | 53 | 48 |
| Components | MAc | 2 | 2 | 2 | 2 | 2 | 2 |
|  | AM | 2 | 2 | 2 | 2 | 2 | 2 |
|  | HEMA | 3 | 3 | 3 | 3 | 3 | 3 |
|  | CB | 3.7 | 3.7 | 3.7 | 3.7 | 3.7 | 3.7 |
| Workability |  | ○ | ○ | ○ | ○ | ○ | ○ |
| Adhesion (g/inch) |  | Unstrippable | 1200 | 150 | 80 | 45 | 18 |
| Laser Cuttability |  | Δ | ○ | ○ | ○ | ○ | ○ |

*Details were given in 1-A.

TABLE 1-2

|  |  | BA-1 | BA-2 | BA-3 | BA-4 | BA-5 |
|---|---|---|---|---|---|---|
| Proportions | AN | 40 | 35 | 35 | 33 | 23 |
| of | MMA | 18 | 18 | 8 | — | — |
| Components | BA | 35 | 40 | 50 | 60 | 70 |
|  | MAc | 2 | 2 | 2 | 2 | 2 |
|  | AM | 2 | 2 | 2 | 2 | 2 |
|  | HEMA | 3 | 3 | 3 | 3 | 3 |
|  | CB | 4 | 4 | 4 | 4 | 4 |
| Workability |  | ○ | ○ | ○ | ○ | ○ |
| Adhesion (g/inch) |  | 9 | 25 | 75 | 110 | 1300 |
| Laser Cuttability |  | ○ | ○ | ○ | ○ | ○ |

TABLE 1-3

|  |  | MAc-1 | MAc-2 | MAc-3 | MAc-4 | MAc-5 | MAc-6 |
|---|---|---|---|---|---|---|---|
| Proportions | AN | 35 | 35 | 35 | 35 | 32 | 31 |
| of | BA | 59.7 | 59.5 | 59 | 55 | 53 | 52 |
| Components | MAc | 0.3 | 0.5 | 1.0 | 5.0 | 10.0 | 12.0 |
|  | AM | 2 | 2 | 2 | 2 | 2 | 2 |
|  | HEMA | 3 | 3 | 3 | 3 | 3 | 3 |
|  | CB | 5 | 5 | 5 | 5 | 5 | 5 |
| Workability |  | X(1) | ○ | ○ | ○ | Δ(2) | X(2) |
| Adhesion (g/inch) |  | 120 | 110 | 80 | 75 | 60 | 60 |
| Laser Cuttability |  | ○ | ○ | ○ | ○ | ○ | ○ |

(1)Agglomerated on addition of carbon black.
(2)Showed an increase in viscosity.

|  | C-3 | | | | | | |
|---|---|---|---|---|---|---|---|
| Run No. | 1 | 2 | 3 | 4 | 5 | 6 | 7 |
| Modulation pulse repetition frequency (kHz) | 0.3 | 0.5 | 1 | 5 | 10 | 20 | 30 |
| Degree of cutting of strippable film | X | ○'*1 | ○ | ○ | ○ | ○ | ○ |
| Degree of damage to PP substrate | ○ | ○ | ○ | ○ | Δ*2 | X | X |

Exciter lamp input: 17 A
(Average output at a modulation pulse repetition frequency of 3 kHz: 2.9 W)
*1The film was not completely cut, but was rated as good (○') because it could be cleanly peeled off along the cutting line.
*2The substrate showed a slight trace of laser light, but was rated as good (Δ) because no change in physical properties was noted.

EXAMPLE 2

Strippable coating films containing varying amounts of carbon black were comparatively evaluated.

Strippable paints were prepared in the same manner as described in Example 1, 1-A except that the amount of carbon black was changed to 3 parts, 5 parts, 10 parts, 20 parts or 25 parts.

Each of the aforesaid aqueous acrylic emulsion type strippable paints containing carbon black was applied with a spray gun to a PP test panel (100×100×3 mm) similar to that used in Example 1, and then dried at 80° C. for 3 minutes to obtain a film having an average thickness of 80–120 μ. The films so formed are hereinaf-

|  | C-5 | | | | | | |
|---|---|---|---|---|---|---|---|
| Run No. | 8 | 9 | 10 | 11 | 12 | 13 | 14 |
| Modulation pulse repetition frequency (kHz) | 0.3 | 0.5 | 1 | 5 | 10 | 20 | 30 |
| Degree of cutting of strippable film | X | ○'*2 | ○ | ○ | ○ | ○ | ○ |
| Degree of damage to PP | ○ | ○ | ○ | ○ | Δ*3 | X | X |

-continued

| | C-5 | | | | | | |
|---|---|---|---|---|---|---|---|
| Run No. | 8 | 9 | 10 | 11 | 12 | 13 | 14 |
| substrate | | | | | | | |

Exciter lamp input: 15 A
(Average output at a modulation pulse repetition frequency of 3 kHz: 2.3 W)
*[2]The film was not completely cut, but was rated as good (O') because it could be cleanly peeled off along the cutting line.
*[3]The substrate showed a slight trace of laser light, but was rated as good (Δ) because no changes in physical properties were noted.

| | C-10 | | | | | | |
|---|---|---|---|---|---|---|---|
| Run No. | 15 | 16 | 17 | 18 | 19 | 20 | 21 |
| Modulation pulse repetition frequency (kHz) | 0.3 | 0.5 | 1 | 5 | 10 | 20 | 30 |
| Degree of cutting of strippable film | X | O | O | O | O | O | O |
| Degree of damage to PP substrate | O | O | O | O | O | Δ | X |

Exciter lamp input: 17 A

| | C-15 | | | | | | |
|---|---|---|---|---|---|---|---|
| Run No. | 22 | 23 | 24 | 25 | 26 | 27 | 28 |
| Modulation pulse repetition frequency (kHz) | 0.3 | 0.5 | 1 | 5 | 10 | 20 | 30 |
| Degree of cutting of strippable film | X | O | O | O | O | O | O |
| Degree of damage to PP substrate | O | O | O | O | O | Δ | X |

Exciter lamp input: 17 A

| | C-20 | | | | | | |
|---|---|---|---|---|---|---|---|
| Run No. | 29 | 30 | 31 | 32 | 33 | 34 | 35 |
| Modulation pulse repetition frequency (kHz) | 0.3 | 0.5 | 1 | 5 | 10 | 20 | 30 |
| Degree of cutting of strippable film | X | O | O | O | O | O | O |
| Degree of damage to PP substrate | O | O | O | O | O | Δ | X |

Exciter lamp input: 17 A

The film had a considerable degree of hardness.

C-25

The film was hard and released powdery carbon black, so that it was unsuitable for use as a strippable film.

| | C-0 (Comparative Example) | | | | | | |
|---|---|---|---|---|---|---|---|
| Run No. | 36 | 37 | 38 | 39 | 40 | 41 | 42 |
| Modulation pulse repetition frequency (kHz) | 0.3 | 0.5 | 1 | 5 | 10 | 10 | 30 |
| Degree of cutting of strippable film | X | X | X | X | X | X | X |
| Degree of damage to PP substrate | O | Δ | X | X | X | X | X |

The laser light not only failed to cut the strippable film, but also caused damage to the substrate comprising the test panel. Adhesion

| Sample | 180° peeling strength (g/inch) |
|---|---|
| C-3 | 80 |
| C-5 | 80 |
| C-10 | 75 |
| C-15 | 73 |
| C-20 | 70 |
| C-25 | 55 |
| C-0 | 80 |

EXAMPLE 3

25 parts of vinyl chloride and 25 parts of dioctyl phthalate were dissolved in 100 parts of a mixture of equal amounts of butyl acetate and isopropyl alcohol, followed by the addition of 0.1 part azobisisobutyronitrile. The resulting mixture was polymerized at 50°-60° C. for 15 hours. Then, carbon black (commercially available from BASF A.G. under the trade name of Mikrolith Black) was added to and mixed with the mixture in an amount of 3 parts as solid carbon black. Thus, there obtained a vinyl chloride sol. This vinyl chloride sol was spray coated on a PP test panel similar to that used in Example 1 and then dried at 80° C. for 3 minutes to form a strippable coating film in accordance with the present invention having an average thickness of 100-150 μ. (The carbon black content based on the resin component was 6%.)

The film was cut in the same manner as described in Example 2. The results thus obtained were as follows.

| Run No. | 1 | 2 | 3 | 4 | 5 | 6 | 7 |
|---|---|---|---|---|---|---|---|
| Modulation pulse repetition frequency (kHz) | 0.3 | 0.5 | 1 | 5 | 10 | 20 | 30 |
| Degree of cutting of strippable film | X | Δ*[2] | O | O | O | O | O |
| Degree of damage to PP substrate | O | O | O | O | O | Δ | X |

Exciter lamp input: 17 A
*[2]The film was cut by only 70%, but was rated as good (Δ) because the film could be cleanly peeled off along the cutting line.

The 180° peeling strength was 150 g/inch.

EXAMPLE 4

This example illustrates a strippable coating film of two-layer construction in which both the overcoating layer and the undercoating layer are formed of acrylic emulsions.

Into a 2-liter four-necked flask fitted with a reflux condenser, a thermometer and a stirrer were charged 600 g of purified water and 2 g of DBS. While $N_2$ gas was being passed through the flask, its contents were heated to 70° C.

500 g of 2EHA, 400 g of BA, 30 g of AA, and 70 g of AN were mixed and a 1/10 portion of the resulting mixture was reserved in another vessel. Then, a monomer emulsion was prepared by adding the remaining portion of the monomer mixture, drop by drop, to 400 g of purified water having 3 g of DBS dissolved therein. To the aforesaid 2-liter flask containing warm water were added 5 g of potassium persulfate and then the previously reserved 1/10 portion of the monomer mixture. After polymerization was carried out for an hour, the monomer emulsion prepared as above was added over a period of 4 hours and the reaction mixture was then polymerized for an additional 4 hours. After completion of the polymerization, the reaction mixture was cooled to 45° C. or below and neutralized to pH 7.5 with 14% aqueous ammonia to obtain an aqueous acrylic emulsion.

To this aqueous acrylic emulsion was added Carbon Black AM-9700 (manufactured by Dainichi Seika Co., Ltd.) in an amount of 30 g as solid carbon black. Thus, there was obtained a coating material (undercoating material) having the adhesive power required for the purpose of the present invention.

First, an undercoating material prepared by adding 3 parts of carbon black to the aforesaid aqueous acrylic emulsion (containing 50 parts of 2EHA, 40 parts of BA, 7 parts of AN, and 3 parts of AA and having a resin content of 50%) was applied to a test panel (100×100×3 mm) made of PP, and then dried (the resulting undercoating layer had an average thickness of 40-50 μ).

Subsequently, an overcoating material prepared by adding 5 parts of carbon black to an aqueous acrylic emulsion formed in the manner described in Example 1 (containing 10 parts of MMA, 55 parts of BA, 33 parts of AN, and 2 parts of AA and having a resin content of 50%) was applied thereto and then dried (the resulting overcoating layer had an average thickness of 50-70 μ). Thus, there was obtained a coating film of two-layer construction.

Using a YAG laser (SL-114F; manufactured by NEC) combined with a Q-switch (SL-231B), this film was cut under varying oscillation conditions.

After the cutting operation, the degree of cutting of the overcoating layer and the degree of damage to the PP panel substrate were examined.

(1) Coating conditions
   (a) Spray coating
   (b) Drying at 80° C. for 5 minutes (for each of the undercoating and overcoating layers)

(2) Laser cutting conditions
   (a) Laser: SL-114F (with an output power of 20 W) and SL-231B (manufactured by NEC)
   (b) Exciter lamp input: 17 A (Average output at a modulation pulse repetition frequency of 3 kHz: 2.9 W)
   (c) Mode: Single mode
   (d) Cutting speed: 50 mm/sec

| Run No. | 1 | 2 | 3 | 4 | 5 | 6 | 7 |
|---|---|---|---|---|---|---|---|
| Modulation pulse repetition frequency (kHz) | 0.3 | 0.5 | 1 | 5 | 10 | 20 | 30 |
| Degree of cutting of overcoating layer | X | Δ | O | O | O | O | O |
| Strippability of film | — | Δ | O | O | O | O | O |
| Degree of damage to PP substrate | O | O | O | O | O | O | Δ |

At a modulation pulse repetition frequency of 500 Hz or lower, the film was not cut satisfactorily. At a modulation pulse repetition frequency of 30 kHz or higher, the film was excessively cut to cause damage to the panel constituting the substrate.

In a modulation pulse repetition frequency range of 1 to 20 kHz, the film was clearly cut without causing damage to the substrate, and could be stripped off to create an attractive boundary line.

The adhesion of the film to the substrate was 300 g/inch as expressed in terms of 180° peeling strength.

EXAMPLE 5

This example illustrates a strippable coating film consisting of two layers of resin coating materials in which the adhesive undercoating material is an acrylic emulsion and the overcoating material is a vinyl chloride sol.

| Adhesive undercoating material (aqueous emulsion having a resin content of 47.5%) | |
|---|---|
| BMA | 42 parts |
| BA | 55 parts |
| AA | 3 parts |
| Carbon black | 3 parts (added later) |
| Overcoating material | |
| Vinyl chloride sol (formulated in the same manner as in Example 3) | 100 parts |
| Carbon black | 3 parts |

| Run No. | 1 | 2 | 3 | 4 | 5 | 6 | 7 |
|---|---|---|---|---|---|---|---|
| Modulation pulse repetition frequency (kHz) | 0.3 | 0.5 | 1 | 5 | 10 | 20 | 30 |
| Degree of cutting of overcoating layer | X | Δ | O | O | O | O | O |
| Strippability of film | X | O | O | O | O | O | O |
| Degree of damage to PP substrate | O | O | O | O | O | O | Δ |
| Average thickness of the adhesive undercoating layer | | | | 50-70 μ | | | |
| Average thickness of the overcoating layer | | | | 40-50 μ | | | |
| Adhesion to the substrate (180° peeling strength) | | | | 180 g/inch | | | |

In the modulation pulse repetition frequency range of 1 to 20 kHz, the film could be clearly cut without causing damage to the substrate.

COMPARATIVE EXAMPLE 1

The procedure of Example 4 was repeated except that the adhesive undercoating layer was a clear layer containing no carbon black. Specifically, the formulations used were as follows.

| Adhesive undercoating material | |
|---|---|
| 2EHA | 50 parts |
| BA | 40 parts |
| AN | 7 parts |
| AA | 3 parts |
| | 100 parts (resin content 50%) |
| Overcoating material | |
| MMA | 22 parts |
| BA | 50 parts |
| AN | 25 parts |
| AA | 3 parts |
| Carbon black | 5 parts (added later) |
| | 105 parts (resin content 50%) |

| Run No. | 1 | 2 | 3 | 4 | 5 | 6 | 7 |
|---|---|---|---|---|---|---|---|
| Modulation pulse repetition frequency (kHz) | 0.3 | 0.5 | 1 | 5 | 10 | 20 | 30 |
| Degree of cutting of overcoating layer | X | Δ | O | O | O | O | O |
| Strippability of film | — | Δ | O | O | O | O | O |
| Degree of damage to PP substrate | O | O | O | O | O | X | X |
| Average thickness of the adhesive undercoating layer | | | | 60-80 μ | | | |
| Average thickness of the overcoating layer | | | | 50-70 μ | | | |

When the undercoating layer contained no carbon black, the laser beam caused damage to the PP substrate if the overcoating layer was cut to a certain extent. That is, the adhesive layer did not perform its buffering function. The boundaries were attractively finished.

COMPARATIVE EXAMPLE 2

The procedure of Example 4 was repeated except that the overcoating layer was a clear layer containing no carbon black. Specifically, the formulations used were as follows:

| Adhesive undercoating material | |
|---|---|
| 2EHA | 50 parts |
| BA | 40 parts |
| AN | 7 parts |
| AA | 3 parts |
| Carbon black | 3 parts (added later) |
| | 103 parts (resin content 50%) |
| Overcoating material | |
| MMA | 22 parts |
| BA | 50 parts |
| AN | 25 parts |
| AA | 3 parts |
| | 100 parts (resin content 50%) |

| Run No. | 1 | 2 | 3 | 4 | 5 | 6 | 7 |
|---|---|---|---|---|---|---|---|
| Modulation pulse repetition frequency (kHz) | 0.3 | 0.5 | 1 | 5 | 10 | 20 | 30 |
| Degree of cutting of overcoating layer | X | X | X | X | X | X | |
| Degree of cutting of undercoating layer | X | X | Δ | O | O | Δ | Δ |
| Strippability of film | — | — | — | — | — | — | |
| Degree of damage to PP substrate | O | Δ | Δ | X | X | X | X |

(1) Since the overcoating layer was not cut at all, the film could not be stripped off along the cutting line and remained continuous all over.

(2) The undercoating layer was cut at modulation pulse repetition frequencies of 3–5 kHz, but refused at 20 kHz (though the re-fused zone was deprived of carbon black to form a transparent streak).

(3) The PP substrate was damaged in the parts where the corresponding parts of the adhesive film consisting of the overcoating and undercoating layers were deprived of carbon black. That is, the substrate was damaged in the parts where the laser light was not intercepted by the overcoating layer. Moreover, at higher modulation pulse repetition frequencies, the substrate was damaged in spite of re-fusion of the undercoating layer. The adhesion of the film to the substrate was 280 g/inch as expressed in terms of 180° peeling strength.

COMPARATIVE EXAMPLE 3

The procedure of Example 4 was repeated except that the undercoating layer was formed of a coating material having the same film-forming properties and film strength as the overcoating material. Specifically, the formulation of the undercoating material was as follows:

| Adhesion to the substrate (180° peeling strength) | 310 g/inch |
|---|---|

| Undercoating material | |
|---|---|
| MMA | 22 parts |
| BA | 50 parts |
| AN | 25 parts |
| AA | 3 parts |
| Carbon black | 5 parts (added later) |
| | 105 parts (resin content 50%) |
| Average thickness of the undercoating layer | 30–50μ |
| Average thickness of the overcoating layer | 30–50μ |
| Adhesion of the film (180° peeling strength) | 100 g/inch |

| Run No. | 1 | 2 | 3 | 4 | 5 | 6 | 7 |
|---|---|---|---|---|---|---|---|
| Modulation pulse repetition frequency (kHz) | 0.3 | 0.5 | 1 | 5 | 10 | 20 | 30 |
| Degree of cutting of overcoating layer | X | Δ | O | O | O | O | O |
| Degree of cutting of undercoating layer | X | X | X | Δ | Δ | O | O |
| Strippability of film | X | X | X | Δ | O | O | O |
| Degree of damage to PP substrate | O | O | O | O | O | O | X |

(1) Even when the overcoating layer was cut, the film could not be stripped off if the undercoating layer was not cut. Thus, the strippability of the film was poor in such a case.

(2) In the range where both the overcoating layer and the undercoating layer could be cut, the substrate was damaged by the laser beam. Thus, the range where the film could be cut without causing damage to the substrate was narrow.

EXAMPLE 6

This example illustrates an inorganic filler-containing strippable coating film of two-layer construction.

An acrylic emulsion having a concentration of 50% was prepared by copolymerizing 54 parts by weight of BMA, 42 parts by weight of BA, 2 parts by weight of methacrylic acid (MAc), and 2 parts by weight of acrylamide in the usual manner. To this acrylic emulsion was added an aqueous carbon black pigment (EP510BR; manufactured by Dainichi Seika Co., Ltd.) in an amount of 4 parts (as solid carbon black). Thus, there was obtained the coating material I.

Next, an acrylic emulsion having a concentration of 50% was prepared by copolymerizing 30 parts of AN, 52 parts of BA, 11 parts of MMA, 3 parts of HEMA, and 2 parts of MAc as in the usual manner. To this acrylic emulsion was added the aforesaid carbon black pigment in an amount of 4 parts (as solid carbon black). Further, calcium carbonate (Calcium Carbonate Super S; manufactured by Maruo Calcium Co., Ltd.) was incorporated into the acrylic emulsion in an amount of 40 parts (as solid calcium carbonate) per 100 parts of the resin. Thus, there was obtained the coating material II (Run No. 6-1 in Table 6-1).

Similarly, the coating materials I and II of Run Nos. 6-2 to 6-5 were prepared according to the formulations given in Table 6-1. In each run, the coating material I was applied with a spray gun to a test panel (10 cm × 10 cm × 3 cm) made of PP so as to give a dry film thickness of about 50 μ, and then dried at 80° C. for 3 minutes. Subsequently, the coating material II was sprayed thereon so as to give a dry film thickness of about 50 μ, and then dried at 80° C. for 5 minutes.

TABLE 6-1

|  |  | (Unit: parts by weight) | | | | |
|---|---|---|---|---|---|---|
|  |  | 6-1 | 6-2 | 6-3 | 6-4 | 6-5 |
| Overcoating Layer (Coating Material II) | AN | 30 | 30 | 30 | 30 | 30 |
|  | BA | 52 | 52 | 52 | 52 | 52 |
|  | MMA | 11 | 11 | 11 | 11 | 11 |
|  | HEMA | 3 | 3 | 3 | 3 | 3 |
|  | MAc | 2 | 2 | 2 | 2 | 2 |
|  | AM | 2 | 2 | 2 | 2 | 2 |
|  | CB | 4 | 4 | 4 | 4 | 4 |
|  | Filler | 40 | — | 40 | — | — |
| Undercoating Layer (Coating Material I) | BMA | 54 | — | — | — | 54 |
|  | BA | 42 | — | — | — | 42 |
|  | 2-EHA | — | 93 | 93 | 93 | — |
|  | MAc | 2 | 1 | 1 | 1 | 2 |
|  | AM | 2 | 1 | 1 | 1 | 2 |
|  | DVB | — | 5 | 5 | 5 | — |
|  | CB | 4 | 4 | 4 | 4 | 4 |
|  | Filler | — | 20 | 20 | 60 | — |
| Evaluation | Allowable range of laser output (W) at a pulse repetition frequency of 5 kHz | 5 | 4.7 | 1.9 | — | 2 |

The test panels thus obtained were laser-cut under the following conditions. The cuttability of the strippable coating film and the degree of damage to the PP panel substrate were examined.

In Run No. 6-4, the coating material II containing 60 parts of calcium carbonate had an excessively high viscosity and could not be dispersed satisfactorily. Moreover, it had such poor application properties that no test panel could be formed.

(1) YAG laser
   YAG laser main unit: SL-114F (manufactured by NEC)
   Q-switching oscillator: SL-231B (manufactured by NEC)
(2) Oscillation conditions
   Single mode
   Mirror controlling method
(3) Cutting conditions
   The test panel was cut while the laser output was changed by varying the Q-switching oscillation conditions (pulse repetition frequency) and the lamp input current.
   (a) Pulse repetition frequency range: 1–30 kHz
   (b) Lamp input current: 14–19 A Each sample was uct under the aforesaid conditions and the results thus obtained are shown in FIGS. 3–6.

In FIGS. 3–6, the abscissa of the graph indicates the laser output (W) which varies with the lamp input current and the pulse repetition frequency. The output was read in an output meter. The ordinate of the graph indicates the pulse repetition frequency of the Q-switching oscillator.

The solid line 1 on the left-hand side of the graph indicates the borderline of cuttability of the overcoating layer. That is, the overcoating layer could not be cut in the area on the left of the solid line 1, while it could be cut in the area on the right thereof. The solid line 2 on the right-hand side of the graph indicates the borderline of damage to the test panel made of PP. That is, the test panel was not damaged in the area on the left of the solid line 2, while it was damaged by the laser beam in the area on the right thereof.

Accordingly, the desirable results of the present invention can be expected in the region defined by overlapping of the area on the right of the left-hand solid line 1 (where the overcoating layer could be cut) and the area on the left of the right-hand solid line 2 (where the test panel was not damaged).

The graphs show that the magnitude of the effect can be evaluated on the basis of "the width of the overlapping region". In Table 6-1, however, the allowable range of the laser output at a pulse repetition frequency of 5 kHz is given as a criterion under the head of "Evaluation".

In each pair of data points (○ or X) shown in the graphs, the left-hand symbol indicates the cuttability of the film and the right-hand symbol indicates the degree of damage to the test panel.

These parameters were rated on the following basis:
(1) Cuttability of the film
   ○ = The overcoating layer was perfectly cut, and the film could be cleanly stripped off to create attractive boundaries.
   △ = Part of the overcoating layer was not cut, but the film could be stripped off along the cutting line. However, the precision of the finish of boundaries was similar to that attainable with the current masking technique.
   X = The overcoating layer was not cut.
(2) Degree of damage to the PP panel substrate
   ○ = There was no sign of damage.
   △ = A slight sign of damage was noted in the surface.
   X = A deep flaw was noted in the trace of the laser beam.

Figure 6:
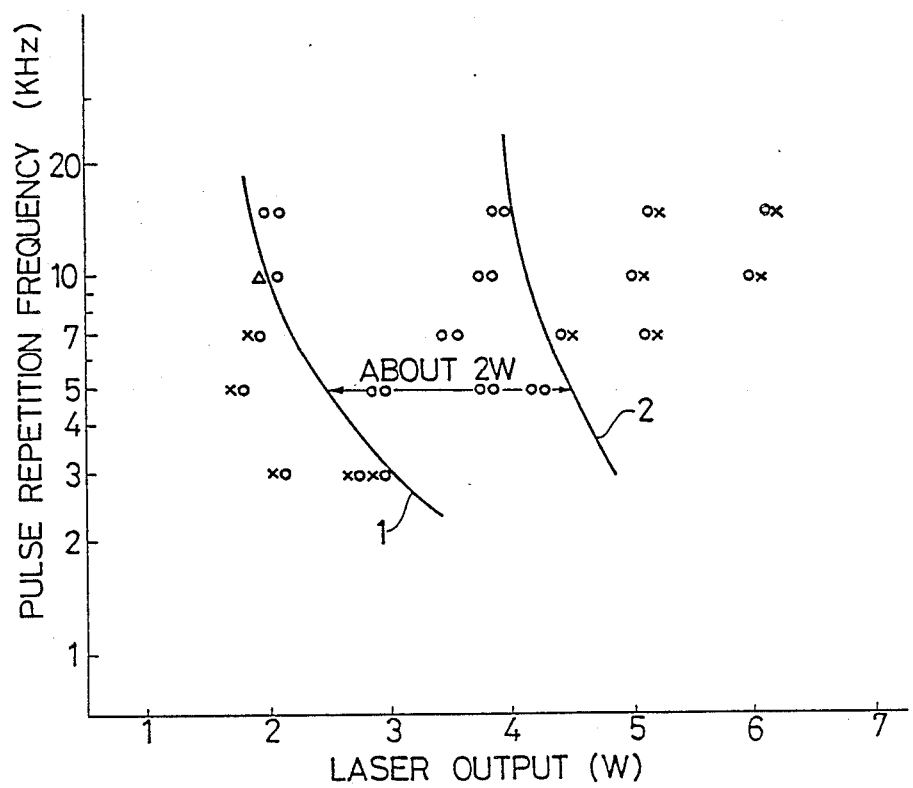
Figure 7:
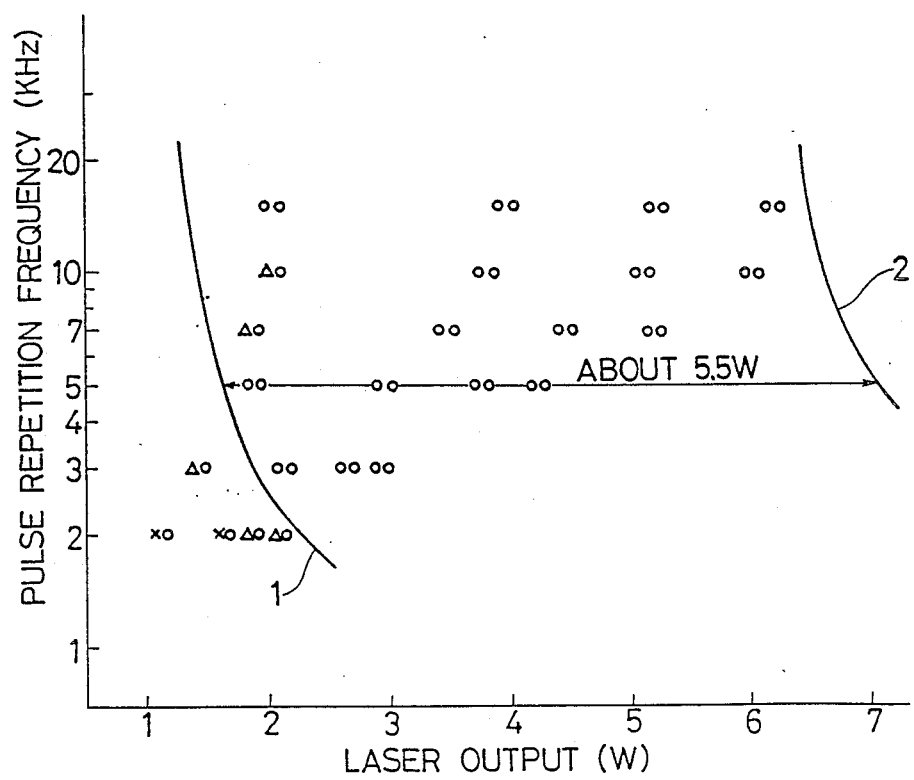
Figure 8:
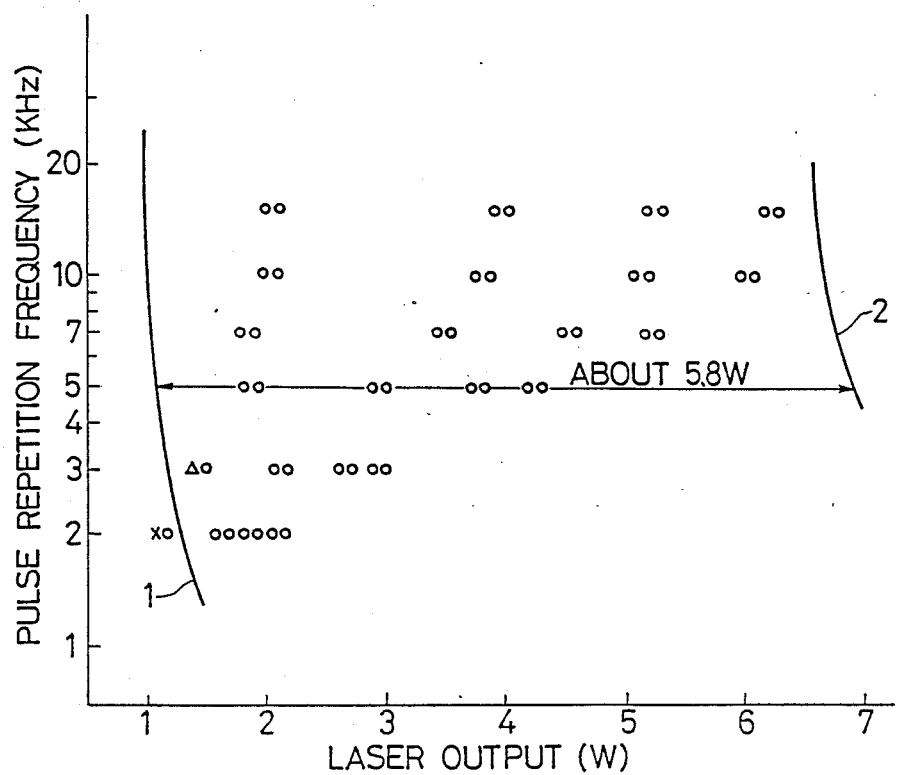
Figure 9:
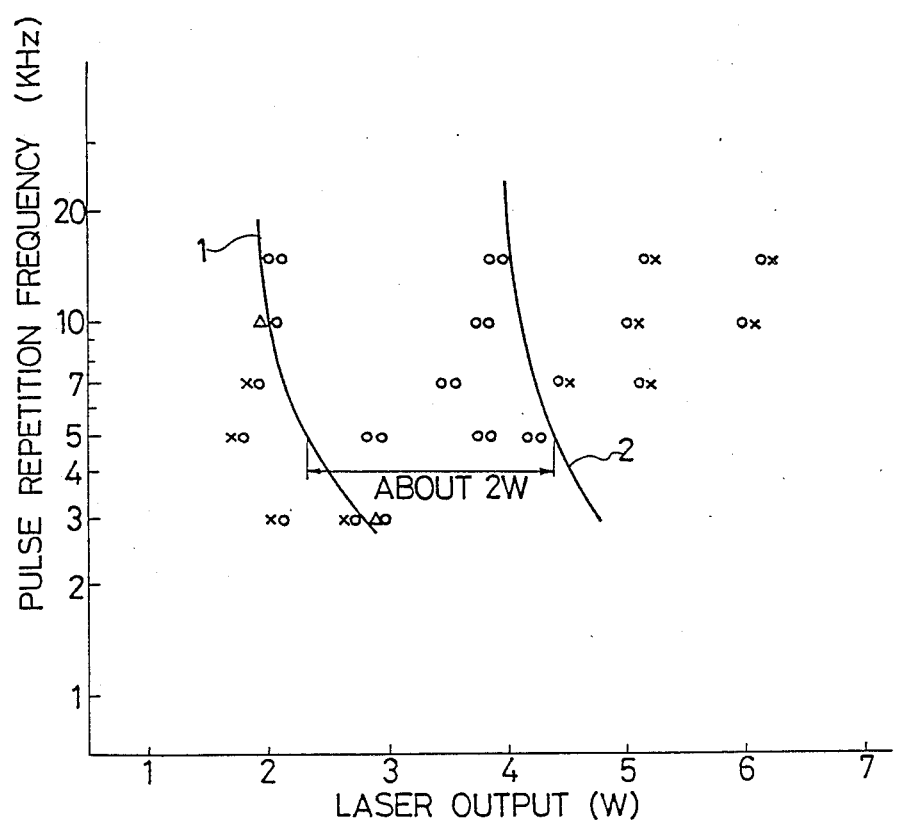
Figure 10:
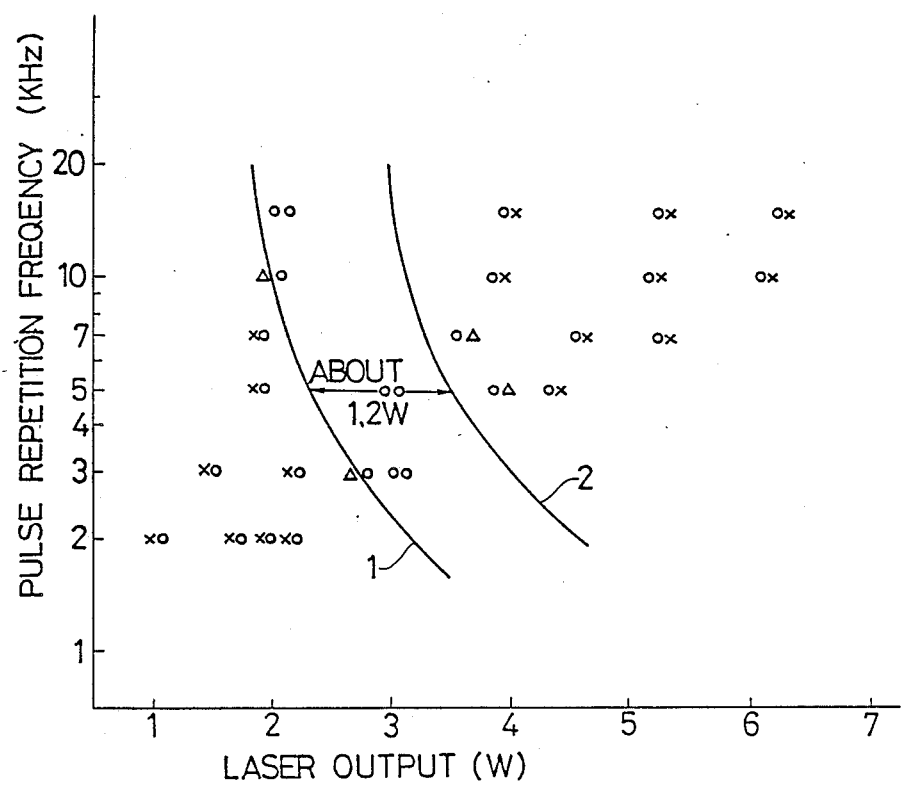

As can be seen from the four graphs so constructed, the laser output range in which the film could be cut without causing damage to the substrate was about 2 W in Run Nos. 6-3 (FIG. 5) and 6-5 (FIG. 6). However, in Run Nos. 6-1 (FIG. 3) and 6-2 (FIG. 4) involving the addition of an appropriate amount of an inorganic filler, the laser output range was as wide as 4.5–5 W and indicates a high degree of utility.

The adhesion to the substrate as expressed in terms of 180° peeling strength was as follow:

|  | 6-1 | 6-2 | 6-3 | 6-4 | 6-5 |
|---|---|---|---|---|---|
| Adhesion (g/inch) | 350 | 107 | 105 | 105 | 350 |

EXAMPLE 7

This example illustrates an aluminum powder-containing strippable coating film of two-layer construction.

An aqueous acrylic emulsion (having a concentration of 50%) was prepared by copolymerizing 93 parts of 2EHA, 5 parts of DVB, 1 part of MAc and 1 part of AM according to the usual emulsion polymerization technique. To this acrylic emulsion were added an aqueous carbon black pigment (EP 510BR; manufactured by Dainichi Seika Co., Ltd.) in an amount of 4 parts based on the resin component and paint grade aluminum powder (manufactured by Toyo Aluminum Co., Ltd.) in an amount of 15%(dry/dry) based on the resin component. Thus, there was obtained the coating material I having adhesive power.

On the other hand, an aqueous acrylic emulsion having a concentration of 50% was prepared by copolymerizing 30 parts of AN, 52 parts of BA, 11 parts of MMA, 3 parts of HEMA, and 2 parts of MAc as in the same manner as described above.

To this acrylic emulsion was added an aqueous carbon black pigment in an amount of 4% (as solid carbon black). Thus, there was obtained the coating material II (Run No. 7-1 in Table 7-1). A film formed of the coating material II had high strength, could be easily stripped as a continuous film, and exhibited on adhesive properties (when tested by the contact method).

Similarly, the coating materials I and II of Run Nos. 7-2 to 7-4 were prepared according to the formulations given in Table 7-1.

In each run, the coating material I was applied with a spray gun to a test panel (100×100×3 mm) made of PP so as to give a dry film thickness of 40-50 μ, and then dried at 80° C. for 5 minutes. Subsequently, the coating material II was sprayed thereon so as to give a dry film thickness of 80-100 μ, and then dried at 80° C. for 5 minutes. Thus, there was obtained a test panel having a coating film of two-layer construction.

The test panels thus obtained were laser-cut under the same conditions as described in Example 6. The cuttability of the strippable coating film and the degree of damage to the PP panel substrate were examined. The results thus obtained are graphically shown in FIGS. 7 to 10 in the same manner as in Example 6, and the results of evaluation obtained in the same manner as in Example 6 are shown in Table 7-1 under the head of "Evaluation". The adhesion of the films to the substrate (180° peeling strength) is also shown in Table 7-1.

TABLE 7-1

| | | 7-1 (FIG. 7) | 7-2 (FIG. 8) | 7-3 (FIG. 9) | 7-4 (FIG. 10) |
|---|---|---|---|---|---|
| Overcoating Layer (Coating Material II) | AN | 30 | 30 | 30 | 30 |
| | MMA | 11 | 11 | 11 | 11 |
| | BA | 52 | 52 | 52 | 52 |
| | HEMA | 3 | 3 | 3 | 3 |
| | MAc | 2 | 2 | 2 | 2 |
| | AM | 2 | 2 | 2 | 2 |
| | Calcium carbonate | — | 40 | — | — |
| | CB | 4 | 4 | 4 | 4 |
| Undercoating Layer (Coating Material I) | 2-EHA | 93 | 93 | 93 | 93 |
| | MAc | 1 | 1 | 1 | 1 |
| | AM | 1 | 1 | 1 | 1 |
| | DVB | 5 | 5 | 5 | 5 |
| | Al powder | 15 | 15 | — | — |
| | CB | 4 | 4 | 4 | 4 |
| Evaluation | Allowable range of laser output (W) at a pulse repetition frequency of 5 kHz | 5.5 | 5.8 | 2 | 1.2 |
| Adhesion to substrate (g/inch) | | 100 | 90 | 100 | 100 |

EXPLOITABILITY IN INDUSTRY

As described above in detail, the strippable coating film of the present invention has excellent masking properties and can be easily and consistently cut with a laser beam, and the coating method of the present invention makes it possible to achieve an attractive finish of the boundaries. Accordingly, the present invention can be widely exploited in a variety of fields involving multi-color painting.

We claim:

1. A strippable coating film containing 1 to °parts by weight of carbon black per 100 parts by weight of a resin component comprising 25 to 40 parts by weight of acrylonitrile, 65 to 40 parts by weight of butyl acrylate, and 0.5 to 10 parts by weight of (meth)acrylic acid present therein, wherein the adhesion of the film to an object to be coated is 20 to 1000 g/inch as expressed in terms of 180° peeling strength.

2. A strippable coating film as claimed in claim 1 wherein the carbon black is furnace black, lamp black, thermal black, acetylene black or German furnace black.

3. A strippable coating film comprising two layers of resin coating materials, wherein the undercoating layer in contact with the object to be coated contains therein 1 to 20 parts by weight (based on the resin component) of carbon black and has adhesive power, wherein the resin component of the undercoating layer is an acrylic and its adhesion to the substrate is 20 to 1000 g/inch as expressed in terms of 180° peeling strength, wherein the overcoating layer located on the surface side contains therein 1 to 20 parts by weight (based on the resin component) of carbon black wherein said layer is flexible and does not exhibit surface tack and and wherein the resin component of the overcoating layer comprises 25 to 40 parts by weight of acrylonitrile, 64 to 40 parts by weight of butyl acrylate, and 0.5 to 10 parts by weight of (meth)acrylic acid.

4. A strippable coating film as claimed in claim 3 wherein either the undercoating layer or the overcoating layer contains an inorganic filler having an average particle diameter of 0.1 to 10 μ in an amount of 5 to 50 parts by weight per 100 parts by weight of the resin component.

5. A strippable coating film as claimed in claim 3 wherein the undercoating layer contains aluminum powder in an amount of 1 to 40 parts by weight per 100 parts by weight of the resin component.

6. A coating method for creating attractively finished boundries which comprises applying a coating material containing 1 to 20% by weight (based on the resin component) of carbon black in the dry film and having adhesive power to an object to be coated wherein the adhesion of the object to be coated is 20-1000 g/inch as expressed in terms of 180° peeling strength, and thereby forming an undercoating layer, the resin component of which is an acrylic resin, in contact with the object to be coated; applying a coating material containing 1 to 20% by weight (based on the resin component) of carbon black in the dry film, having flexibility and exhibiting film-forming properties to the undercoating layer and thereby forming a surface layer, the resin component of which comprises 25 to 40 parts by weight of acrylonitrile, 65 to 40 parts by weight of butyl acrylate, and 0.5 to 10 parts by weight of (meth)acrylic acid, to produce a strippable coating film composed of two layers both containing carbon black; cutting only the surface layer of the coating film with a laser beam from a YAG laser; stripping off the unnecessary portions of the laser-cut surface layer together with the underlying adhesive layer; applying a final coat of paint to the parts from which the coating film has been removed; and stripping off the remaining portions of the strippable coating film.

7. A method as claimed in claim 6, wherein the YAG laser is equipped with a pulse repetition frequency in the range of 500 Hz to 10 kHz.

* * * * *

UNITED STATES PATENT AND TRADEMARK OFFICE
CERTIFICATE OF CORRECTION

PATENT NO. : 4,886,704

DATED : December 12, 1989

INVENTOR(S) : KEIICHI KAMADA ET AL

It is certified that error appears in the above-identified patent and that said Letters Patent is hereby corrected as shown below:

Column 21, claim 1, line 63:

reads "A strippable coating film containing 1 to °parts by"

should read --A strippable coating film containing 1 to 20 parts by --

Signed and Sealed this

Twenty-fifth Day of December, 1990

*Attest:*

HARRY F. MANBECK, JR.

*Attesting Officer*  *Commissioner of Patents and Trademarks*